United States Patent [19]

Chang et al.

[11] Patent Number: 5,154,326

[45] Date of Patent: Oct. 13, 1992

[54] VIBRATOR AND SCREW COMBINED CONVEYING DEVICE USED IN WEIGHING OF POWDER

[75] Inventors: Yuen-Wai Chang, Taipei Hsien; Chiou-Fwu Chen, Yilan Hsien, both of Taiwan

[73] Assignee: Gain Lab Corporation, Taipei, Taiwan

[21] Appl. No.: 666,129

[22] Filed: Mar. 7, 1991

[51] Int. Cl.⁵ ............................................. B65D 83/00
[52] U.S. Cl. .................................. 222/196; 198/533; 198/550.1; 198/670; 198/671; 222/234; 222/278; 222/413
[58] Field of Search ............... 222/196, 233, 234, 278, 222/412, 413; 198/533, 550.1, 661, 670, 671

[56] References Cited

U.S. PATENT DOCUMENTS

| | | | |
|---|---|---|---|
| 2,800,252 | 7/1957 | Wahl | 222/233 X |
| 3,203,599 | 8/1965 | Renner | 198/533 X |
| 3,212,624 | 10/1965 | Hess | 198/670 X |
| 4,391,561 | 7/1983 | Smith et al. | 198/661 X |
| 4,945,957 | 8/1990 | Kardux et al. | 222/196 X |

FOREIGN PATENT DOCUMENTS 1442466 12/1988 U.S.S.R. .............................. 222/233

Primary Examiner—Kevin P. Shaver
Assistant Examiner—Joseph A. Kaufman
Attorney, Agent, or Firm—Bacon & Thomas

[57] ABSTRACT

A conveying device used in weighing apparatus for conveying powder comprising a conveying cylinder which is subjected to a vibrational movement by a vibrator to finely control the powder exited from the cylinder. Inside the conveying cylinder, there is a shaft with first and second blade segments which is actuable to rotate, thereby receiving powder from a loading hopper and exiting the powder to an outside. The vibrational movement of the conveying cylinder is irrespective of the rotational movement of the shaft, and either one or both of the conveying cylinder and the shaft is selected to operate to obtain a desired quantity of powder, ranging from a very small quantity where only the vibrator operates to a very large quantity where both the vibrator and the shaft operate.

9 Claims, 6 Drawing Sheets

5,154,326

VIBRATOR AND SCREW COMBINED CONVEYING DEVICE USED IN WEIGHING OF POWDER

BACKGROUND OF THE INVENTION

The present invention relates generally to weighing apparatuses for powder. More particularly, the present invention relates to vibrator and screw combined conveying devices for the weighing apparatus for finely ground powders, for example pharmaceutical powders, in which a vibrator is incorporated into the conveying device to provide a vibrational conveying action, irrespective of the normal conveying operation by a driving shaft having spiral blades thereon, so that a wide range of weight of powder, particularly a very small quantity of powder, can be exited from the conveying device of the invention.

Prior art conveying device used in weighing apparatuses are not suitable for exiting small quantities of powder by a rotational action of a shaft with helical blades, not only because the number of rotations of the shaft is generally difficult to finely control but also because the quantity of powder that will be exited in one rotation is difficult to calculate or control. As is well known the shaft with helical blades, or a screw as is generally called, like an auger in outer appearance, is generally provided within a hollow cylinder for exiting powder by means of the rotational movement of the shaft about its own axis. Under a given rotation speed of the shaft, the quantity of powder exited is proportional to the peripheral diameter of the blades. To exit different quantities of powder, two or more sets of cylinders and augers of different size may be required. For high precision measurements, for example, in the order of 0.01 g, it is necessary to provide a cylinder and an auger both of a very small size. However, this still does not resolve the problem that the quantity of powder to be exited in one rotation of the shaft is difficult to anticipate, such as a spontaneous falldown of a pile of powder.

Another problem encountered in prior art conveying devices is that "viscous" powder, as well as coarse powder, that might be harmful to the blades and the cylinder wall, tends to cohere or coagulate, thereby interfering with the rotation of the shaft. In other words, pushing force of the blades by a simple rotational movement of the shaft is not sufficient to prevent such powders from causing damage to the conveying device.

There is a need for the conveyed quantity of powder to be finely controlled to meet highly precise tolerances, as well as a need for satisfying wide range of quantities that can be measured in a single device to suit practical use. Also, such a conveying device should be able to handle "viscous" and very coarse powders in an effective manner as for ordinary powder.

SUMMARY OF THE INVENTION

Accordingly, it is an object of this invention to provide a vibratory conveying device which applies a vibrational movement to the conveying cylinder so that a very small quantity of powder can be exited to meet precision requirements.

A further object of this invention is to provide a vibratory conveying device which can exit powder in a wide range of varying quantities by either a vibrational movement of the conveying cylinder, a rotational movement of the shaft with blades, or both, in order to obtain a very small quantity of powder, a medium quantity of powder, or a large quantity of powder, respectively.

Another object of this invention is to provide a vibratory conveying device which alleviates the accumulation phenomenon and is therefore effective for handling "viscous" powder and coarse powder.

These and additional objects, if not set forth specifically herein, will be readily apparent to those skilled in the art from the detailed description provided hereinbelow, with appropriate reference to the accompanying drawings.

DETAILED DESCRIPTION OF THE PREFERRED EMBODIMENT

Figure 1:
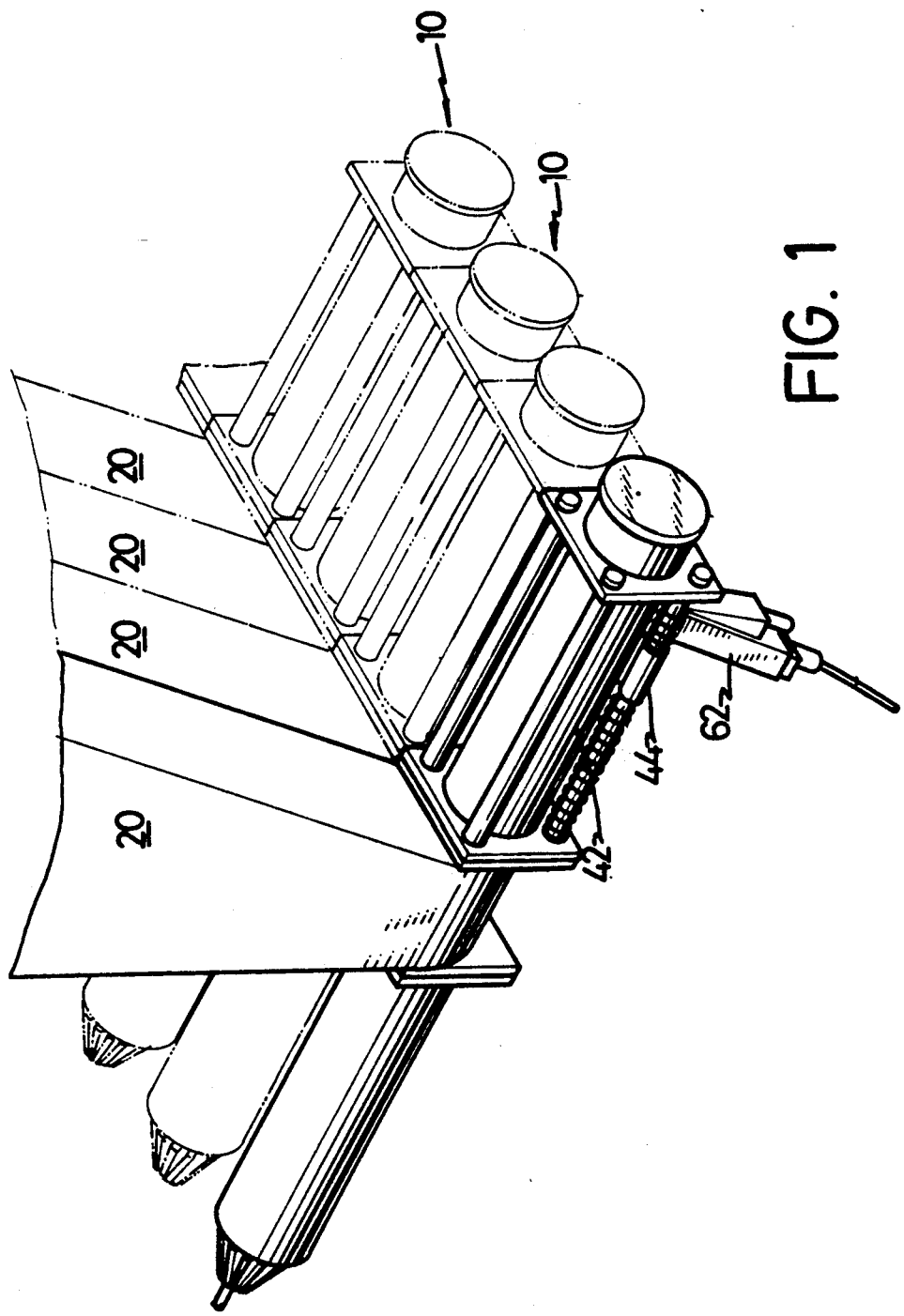
FIG. 1 is a perspective view of an array of vibratory conveying devices according to the present invention mounted on lower ends of respective loading hoppers.
Figure 2:
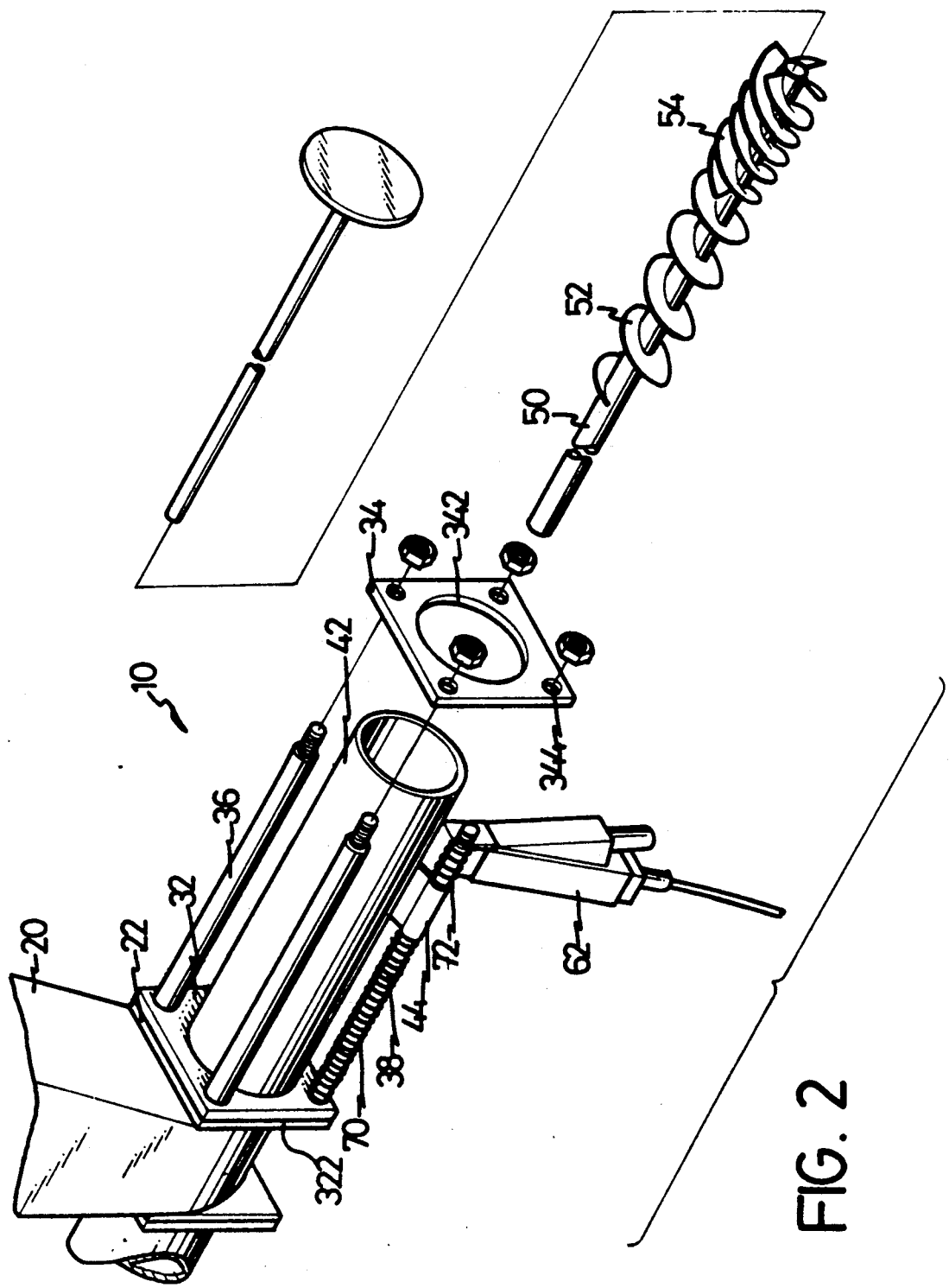
FIG. 2 is a partially exploded view of one vibratory conveying device shown in FIG. 1, with certain portions being omitted or cut away for increased clarity.
Figure 3:
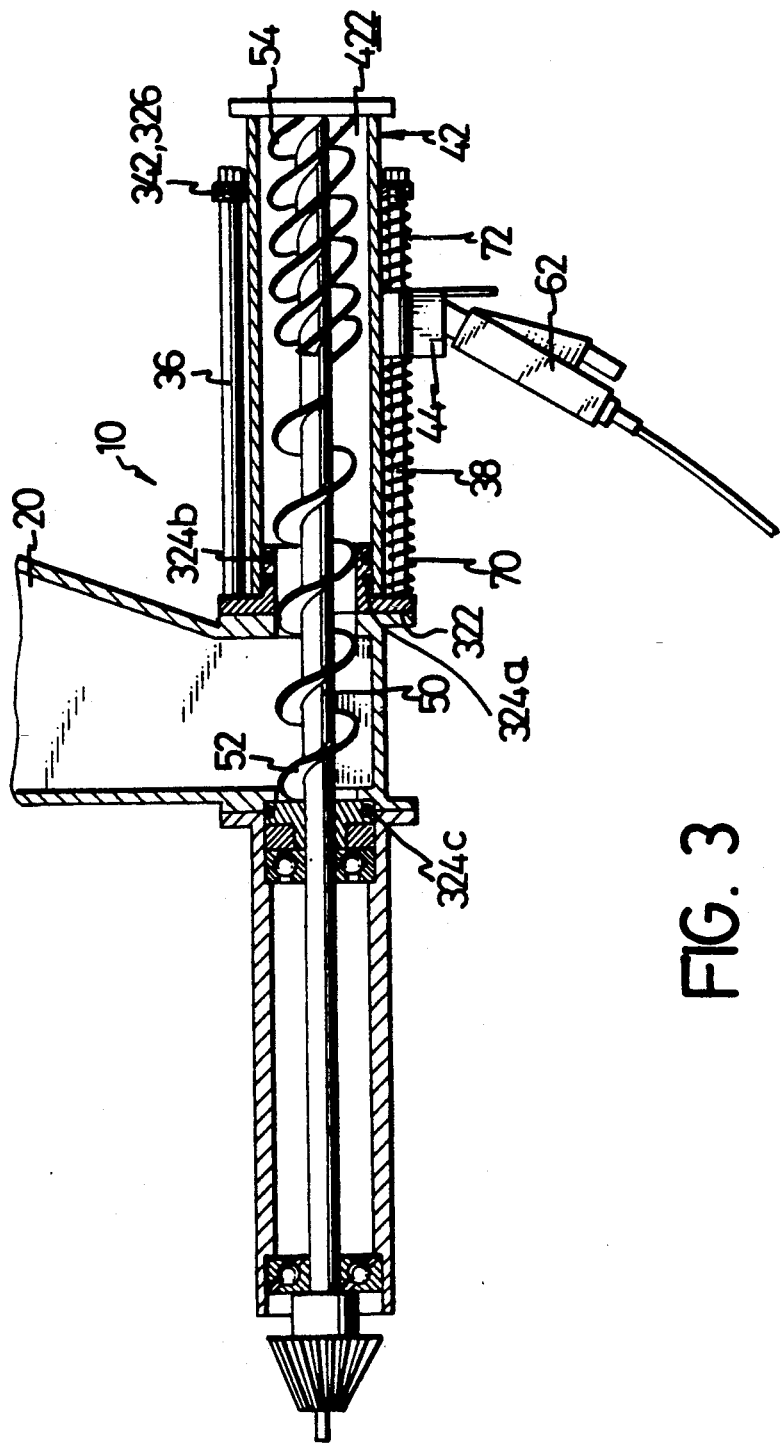
FIG. 3 is a longitudinal cross-section of the vibratory conveying device of FIG. 2.

Referring now to the drawings, and more particularly to FIGS. 1 to 3, there is shown a number of vibratory conveying devices of the present invention each mounted to a lower end of a corresponding loading hopper 20 placed side by side. The hopper 20 has a lower end and a tunnel extending through said lower end to form a hole. The vibratory conveying device, generally designated by reference numeral 10, comprises a supporting means fixedly mounted on the loading hopper 20 at two opposite sides thereof, a chamber means mounted in a movable relationship to the supporting means, a driving means for exiting powder by a shaft and blade combination, and a vibrator means mounted in a fixed relationship to the chamber means for exiting powder by applying vibration to the chamber means.

The chamber means comprises a hollow cylinder 42 which defines a chamber 422 having an inlet in communication with the loading hopper 20 and an outlet in communication with an outside for exiting powder (cf. FIGS. 4-6), and a mounting element 44 fixedly attached to a bottom of the cylinder 42. As best shown in FIGS. 2 and 3, the supporting means substantially comprises a first bearing element 32 having a central tube therethrough, a pair of connecting rods 36 passing through the first bearing element 32 and fixing the element 32 to the loading hopper 20, a pair of support rods 38 (only one is visible in the drawings) elastically or movably supporting the mounting element 44 of the chamber means, and a second bearing element 34 circumventing the hollow cylinder 42 of the chamber means. The first bearing element 32 has a mounting side 322 for matchingly mounting to a side flange 22 of the loading hopper 20, and an outer side 324 for bearing on an inside wall of the hollow cylinder 42. Two sealing rings 324a and 324b are mounted around the outer side 324 for restraining powder from spreading out between the outer side 324 and the hollow cylinder 42. A third sealing ring 324c is mounted on the inner side of the second bearing element. The second bearing element 34 has an inner side 342 for circumventing an outside wall 426 of the hollow cylinder 42 and a plurality of holes 344 corresponding to the connecting rods and support rods 36 and 38 so that the second bearing element 34 can be releasably mounted to the rods 36 and 38 by means of nut and bolt connection.

The mounting element 44 of the chamber means, which is fixedly attached to the hollow cylinder 42, is slidably mounted on the pair of support rods 38 of the supporting means so that the chamber means is mounted in a movable relationship to the supporting means.

As mentioned above and as can be seen in FIG. 3, the supporting means is fixedly mounted on the loading hopper 20 at two opposite sides thereof. Since components shown on the left-hand side of FIG. 3 does not constitute a part of the invention, a detailed description thereof is not deemed necessary. However, these components will be briefly mentioned in conjunction with the description for the driving means hereinbelow.

The driving means for conveying powder from the loading hopper 20 to the hollow cylinder 42, and then exiting the powder to the outside, comprises a shaft 50 and blades on the shaft 50. The shaft extends to the other side of the loading hopper 20 where it is rotatably supported in known manner, for example, by bearings, on the supporting means. Gears may be provided on said end of the shaft 50 so that the driving means can be rotated with respect to the supporting means. The blades consist a first helical blade segment 52 and a second helical blade segment 54. The blade segment 52 extends substantially from near a middle portion of the hollow cylinder 42 to the loading hopper 20, and the blade segment 54 extends substantially from near the middle portion of the cylinder 42 to a free end of the shaft 50. As such, the blade segment 52 introduces powder from the loading hopper 20, through the inlet of the cylinder 42, to approximately the middle portion of the cylinder 42, and then the blade segment 54 continues conveying the powder to the outlet of the cylinder 42. It is noted that the second helical blade 54 comprises helical blades that are more closely spaced than that on the first helical blade 52 so that the second blade segment 54 conveys powder with a greater rate than the first blade segment 52, thereby preventing the accumulation of powder at the outlet of the cylinder 42 which would interfere with the normal conveying operation of the device. Also, it is noted that the first and second helical blade segments 52 and 54 have an outer diameter which is smaller than an inner diameter of the hollow cylinder 42, which will be further described hereinbelow.

The vibrator means is fixedly attached to a bottom of the mounting element 44 of the chamber means so that the chamber means and the vibrator means form a unit which is mounted in a movable relationship with respect to the mounting means. The vibrator means comprises a vibrator 62 of any suitable type that can be actuated to vibrate in order to impart a vibrational action to the cylinder 42, thereby urging powder within the cylinder 42 to move from the inlet to the outlet of the cylinder 42. As such, the vibrator means also conveys and exits powder, irrespective of the operation of the shaft 50 of the driving means. Preferably, the vibrator 62 is positioned in a direction pointed away from the loading hopper 20 and inclined at about 60° relative to a longitudinal axis of the cylinder 42, as shown in FIG. 3, in order to effectively convey and exit powder within the cylinder 42 to outside. Further, the vibrator means is mounted on the cylinder 42 adjacent to the outlet thereof, so that there is a larger moment arm with respect to a mounting position between the cylinder 42 and the first bearing element 32 of the supporting means. To allow effective vibrational movement of the cylinder 42, there is a retention means provided on each of the pair of support rods 38. The retention means preferably comprises a first spring 70 and a second spring 72 on opposite sides of the mounting element 44. The first and second springs 70 and 72 retain the mounting element 44, and therefore the chamber means in its original position.

Figure 4:
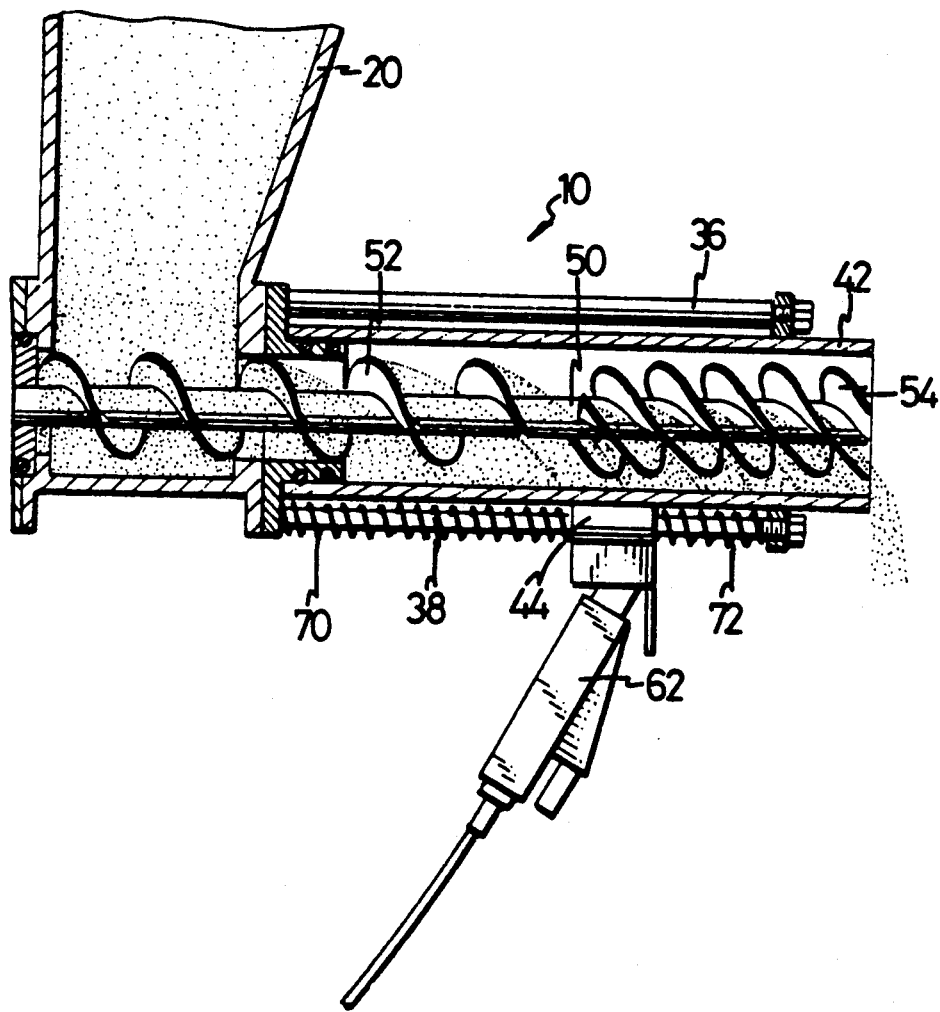
FIG. 4 is a view similar to FIG. 6, but showing a large quantity of powder being exited from the conveying cylinder under a combined vibrational and rotational movement.
Figure 5:
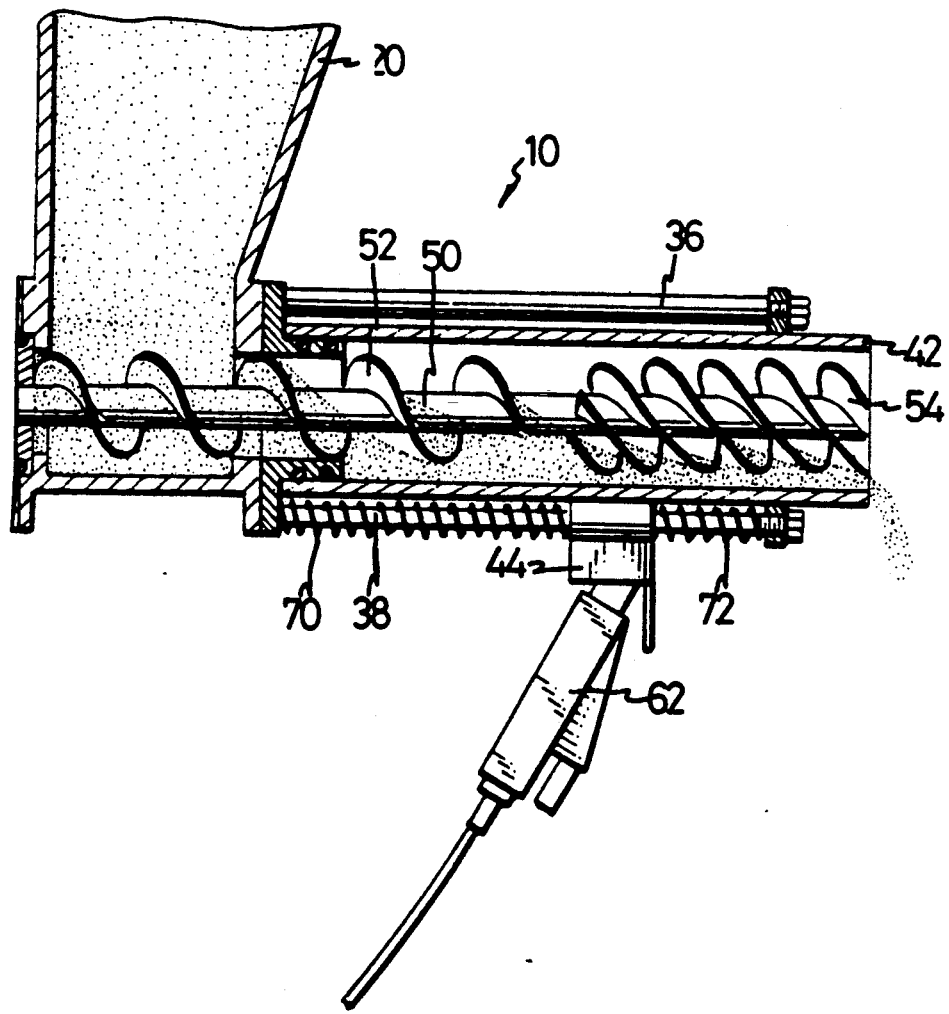
FIG. 5 is a view similar to FIG. 4, but showing a medium quantity of powder being exited from the conveying cylinder under a rotational movement of the shaft with blades.
Figure 6:
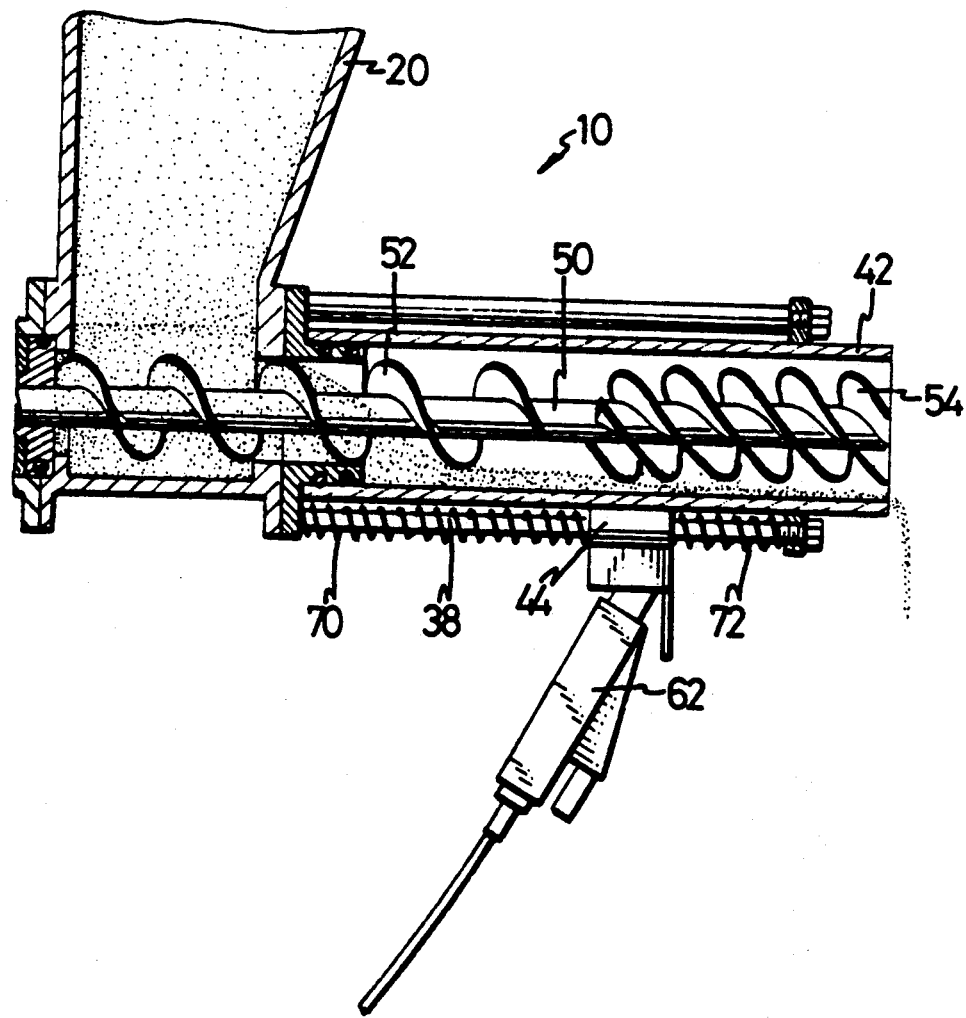
FIG. 6 is an enlarged view of FIG. 3, showing a very small quantity of powder being exited from the conveying cylinder while being subjected to a vibrational movement.

Referring now to FIGS. 4 through 6 which show the quantity of powder exited from the cylinder in various operating modes of the device of the invention: FIG. 6 shows the cylinder 42 being subjected to a vibrational movement; FIG. 5 shows the powder being moved toward the outside due to the rotational movement of the shaft 50; and FIG. 4 shows both the vibrational movement and the rotational movement being applied to convey the powder. In these figures, it is clear that the first and second helical blade segments 52 and 54 are thus sized to have an outer diameter smaller than the inner diameter of the hollow cylinder 42, a void space is formed between the blade segments 52 and 54 and the cylinder wall, thereby allowing powder a vibrational movement thereunder and facilitating the flow of powder. The relevant operations in these figures are apparent so that they will not be described in detail herein. However, it is noted that, with the provision of the vibrational movement of the cylinder 42, the powder can be conveyed in a greater quantity and in a more efficient manner than solely by the rotation of the shaft 50 and the provision of the blades 52 and 54.

While the present invention has been explained in relation to its preferred embodiment, it is to be understood that various modifications thereof will be apparent to those skilled in the art upon reading this specification. Therefore, it is to be understood that the invention disclosed herein is intended to cover all such modifications as shall fall within the scope of the appended claims.

We claim:

1. A conveying device comprising:
   a) a loading hopper including a lower side and a side flange;
   b) a supporting means mountable to the lower side of the loading hopper;
   c) a chamber means elastically mounted to said supporting means, said chamber means comprising a mounting element elastically supported on said supporting means, said chamber means defining a chamber having an inlet and an outlet, said inlet opening to the loading hopper for receiving powder therefrom and said outlet opening to an outside for exiting powder;
   d) a driving means for conveying powder from the loading hopper from said inlet through said chamber to said outlet to the outside, said driving means conveying powder within said chamber at a greater rate near said outlet of said chamber than near said inlet of said chamber;

e) the supporting means including a first bearing element having a mounting side adapted to match to the side flange of the loading hopper and an outer side for bearing against an inside wall of said chamber near said inlet, a plurality of connecting rods for fixing said first bearing element to the loading hopper and a pair of support rods for elastically supporting said mounting element of said chamber means, and a second bearing element having an inner side for circumventing an outside wall of said chamber near said outlet, said second bearing element being releasably mounted on a respective end of each connecting rod; and f) a vibrator means mounted in a fixed relationship to said chamber means and being capable of imparting a vibrational action with respect to said supporting means and said chamber means, thereby urging powder within said chamber to move from said inlet to said outlet, irrespective of any conveying movement of powder by said driving means.

2. The conveying device of claim 1 further comprising a pair of first sealing rings mounted on said outer side of said first bearing element, and a second sealing ring mounted on said inner side of said second bearing element for movably supporting the chamber means on said first and second bearing elements.

3. The conveying device of claim 1 further comprising retention means on each support rod for limiting a vibrational movement of said mounting element said chamber means on said support rods.

4. The conveying device of claim 3 wherein said retention means comprises a first spring and a second spring provided on opposite sides of said mounting element.

5. The conveying device of claim 1 wherein:

a) said chamber means comprises a hollow cylinder fixedly supported on a top of said mounting element;

b) said driving means comprises a shaft supported in a rotatable relationship with respect to the loading hopper, a first helical blade segment extending substantially from an approximate midsection of said cylinder into the loading hopper, and a second helical blade segment extending substantially from said midsection to an external free end of said shaft;

c) said first and second helical blade segments have an outer diameter that is smaller than an inner diameter of said hollow cylinder;

d) said vibrator means comprises a mechanical vibrator fixedly attached to a bottom of said mounting element of said chamber means, said vibrator being positioned so as to vibrate in a direction away from the loading hopper and inclined approximately 60° relative to a longitudinal axis of said hollow cylinder, thereby vibrating said hollow cylinder to urge powder therewithin to exit from said outlet of said chamber means; and e) said mounting element is so positioned on said support rods that a vibrational force of said vibrator has a moment arm of at least one-half of the longitudinal length of said cylinder.

6. A device for conveying powder comprising:

a) a hopper having a lower end and a tunnel extending through said lower end to form a hole surrounded by a flange;

b) a first bearing element corresponding to said flange of said hopper and having a central tube corresponding to said hole of said hopper;

c) at least three rods for fixing said first bearing element to said flange of said hopper;

d) a second bearing element being releasably mounted on a respective end of each rod and formed with a central hole;

e) a chamber being insertable through said hole of said second bearing element and having an inlet enclosing said tube of said first bearing element for receiving powder from said hopper and an outlet for exiting powder;

f) driving means for conveying powder from said hopper through said inlet, said chamber, and said outlet to the outside at a greater rate near said outlet of said chamber then near said inlet of said chamber;

g) a mounting element being fixed to said chamber and slidably mounted on at least one of said rods; and h) vibrator means being fixed to said chamber means for imparting a vibrational action with respect to said hopper and said chamber, thereby urging powder within said chamber to move from said inlet to said outlet, irrespective to any conveying movement of powder by said driving means.

7. The device of claim 6, further comprising at least one sealing ring enclosing said tube of said first bearing element for restraining powder from spreading between said chamber and said tube of said first bearing element to the outside.

8. The device of claim 6, further comprising retention means on at least one said rod for cooperating with said mounting element for limiting the vibrational movement of said chamber.

9. The device of claim 8, wherein said retention means comprises a first spring sandwiched by said first bearing element in a first side of said mounting element and a second spring sandwiched by said second bearing element in a second side of said mounting element.

* * * * *